UNITED STATES PATENT OFFICE.

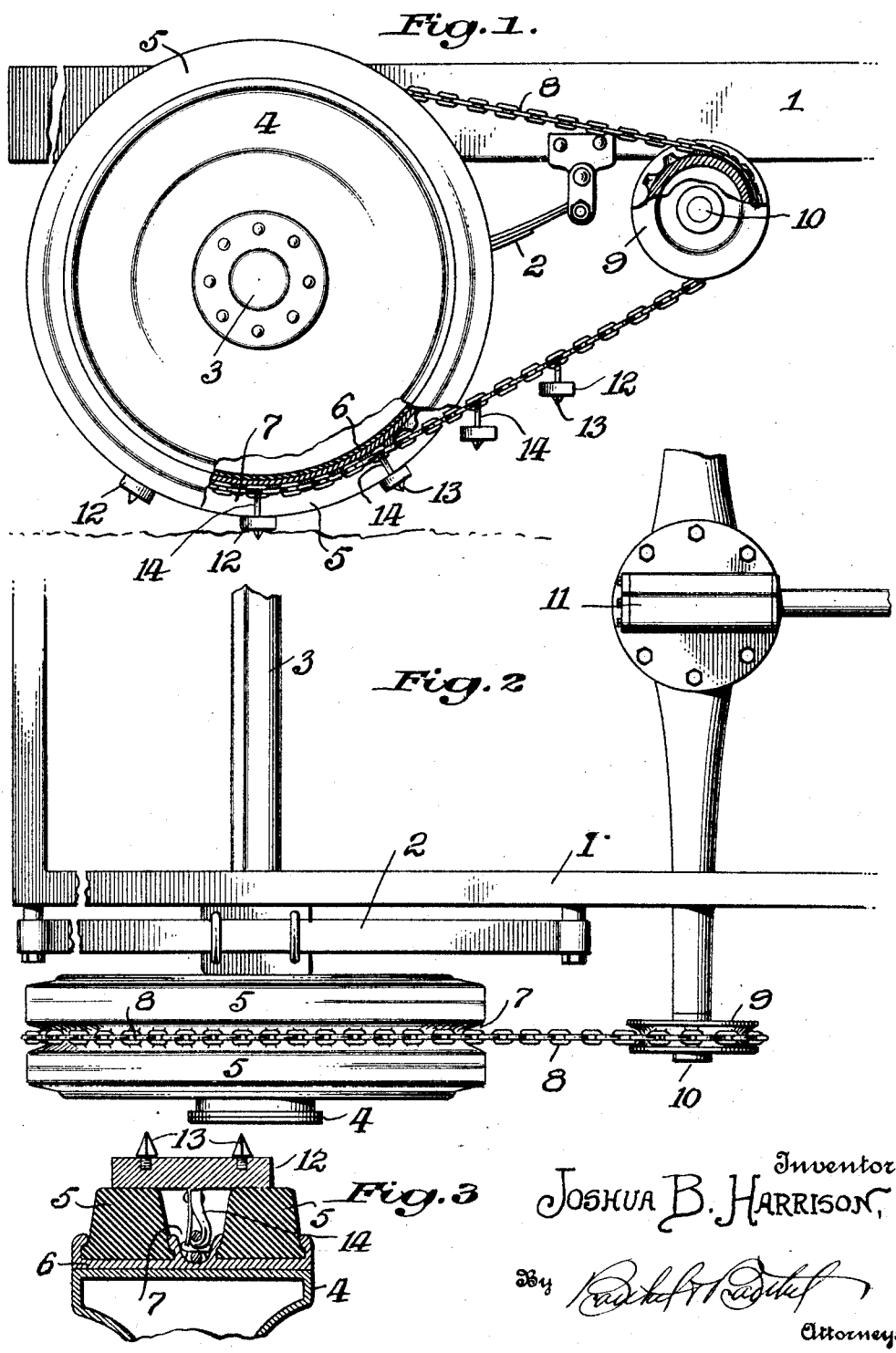

JOSHUA B. HARRISON, OF DETROIT, MICHIGAN.

ANTISKIDDING DEVICE.

1,318,553.  Specification of Letters Patent.  Patented Oct. 14, 1919.

Application filed April 19, 1919. Serial No. 291,185.

*To all whom it may concern:*

Be it known that I, JOSHUA B. HARRISON, a citizen of the United States of America, residing at Detroit, in the county of Wayne and State of Michigan, have invented certain new and useful Improvements in Antiskidding Devices, of which the following is a specification, reference being had therein to the accompanying drawings.

The primary object of my invention is to provide novel anti-skidding devices that may be easily and quickly attached to a power transmission member employed for applying power to the periphery of a vehicle wheel, to prevent the wheel from slipping and skidding on smooth and wet surfaces, particularly when rounding a curved section of road or encountering ruts, holes and other depressions in which a wheel is lodged and experiencing difficulty to move forward.

Another object of my invention is to utilize a log chain for transmitting power from the ends of a driving shaft to the wheels of a truck, tractor or other vehicle, the power being transmitted to the peripheries of the wheels and when the chains are equipped with the anti-skidding devices the driving mechanism conforms somewhat to the caterpillar type, which for heavy and large vehicles has proven effective for moving the vehicles where other driving mechanisms failed.

A further object of my invention is to accomplish the above results by a simple, durable, safe and inexpensive mechanical construction that will be hereinafter described and then claimed, and reference will now be had to the drawings, wherein—

Figure 1 is a side elevation of a portion of a vehicle provided with a driving mechanism in accordance with my invention;

Fig. 2 is a plan of the same; and

Fig. 3 is an enlarged cross sectional view of a portion of a vehicle wheel showing an anti-skidding device thereon.

In the drawing, the reference numeral 1 denotes a portion of a vehicle frame supported by a spring 2 or other suitable means from a rear axle 3 provided with a wheel 4. Only one wheel has been illustrated, but it is to be understood that this wheel and other parts to be hereinafter referred to are duplicated on the opposite side of the frame 1 from that shown. The wheel 4 is of that type having a wide tread formed of two solid tires 5 mounted on a rim 6, and said rim, between the tires 5 is provided with an annular chainway 7 for an endless log chain 8 constituting a power transmission member. The chainway 7 has depressions and protuberances so that the links of the log chain may establish a driving relation between the rim 6 and the chain, whereby power may be imparted to the wheel 4 as close to the tread or periphery thereof as possible.

The chain 8 is trained over a driving pulley or sheave 9 on the outer end of a driving shaft 10 said driving shaft being supported by the frame 1 in advance of the rear axle 3. A conventional form of worm and worm gear power transmission mechanism, generally designated 11, may be employed for operating the shaft 10 in a suitable power plant (not shown). The pulley or sheave 9 is also provided with depressions and protuberances so as to prevent the log chain from slipping thereon, and with the chain between the tires 5 of the wheel, the tires may cushion the wheel without any interference by the chain.

That form of double tire shown will slip and skid on smooth and wet surfaces and when in a rut or hole, it is extremely difficult for the wheel under the power applied thereto, to ride out of the rut or hole without some means being provided so that the tire may obtain a purchase and surmount the obstacle. With this end in view, I provide anti-skidding devices that may be easily and quickly attached to the chain 8 so as to increase the tractive power of the tire. Each device comprises a block 12 having detachable calks or spuds 13 adapted to engage in the ground. Intermediate the ends of the block 12 is a snap fastener 14 which permits of the block being attached to the chain, as shown in Fig. 1, and with the blocks transversely disposed it is obvious that the blocks will engage under the tires 5, that is, between said tires and the ground. With the weight of the wheel on the block 12, said block may be pressed into the resilient tires 5 and thus be further held relative to the tire while the wheel revolves, and with the anti-skidding devices properly spaced about on the chain one or more of the devices can be brought into action with each wheel. By carefully disposing the anti-skidding devices whereby the devices of one chain will alternate with the devices of another chain, it is always possible to increase the tractive power of one of the vehicle wheels, and at no time will it be possible for both wheels to slip and skid.

The fasteners 14 prevent the blocks 12 from swinging to any great extent, and said fasteners are adapted to maintain the blocks transversely of the chain. The block may rest on the chain when passing upwardly over the wheel 4 and over the pulley 9, and there is no possibility of said block interfering with the driving mechanism of the wheel.

With the anti-skidding devices detachable it is only necessary to install the same when smooth and slippery roads are encountered or the wheels of the vehicle accidentally enter deep ruts or holes, otherwise the wheels may travel on the tires 5 and have the load cushioned in the usual manner.

One embodiment of my invention has been illustrated, but it is to be understood that the structural elements are susceptible to such variations and modifications as fall within the scope of the appended claims.

What I claim is:—

1. The combination of a wheel having the periphery thereof provided with a chainway, a log chain in the chainway of said wheel for imparting movement thereto, and anti-skidding devices detachably connected to said chain and extending transversely thereof.

2. The combination set forth in claim 1, and wherein the periphery of said wheel is shaped so as to support the ends of said anti-skidding devices as said devices are carried under said wheel.

3. The combination of a wheel, a set of tires thereon with a chainway between said tires, a log chain trained about said wheel in the chainway thereof and adapted for imparting movement to said wheel, and anti-skidding devices detachably connected to said chain and adapted to rest on said tires and transversely thereof when passing under said wheel.

In testimony whereof I affix my signature in the presence of two witnesses.

JOSHUA B. HARRISON.

Witnesses:
KARL H. BUTLER,
ANNA M. DORR.

Copies of this patent may be obtained for five cents each, by addressing the "Commissioner of Patents, Washington, D. C."